United States Patent [19]

Jones

[11] 4,043,496
[45] Aug. 23, 1977

[54] FRICTION WELDING MACHINE
[75] Inventor: Emyr Jones, Bridgenorth, England
[73] Assignee: Clarke Chapman Limited, Tyne and Wear, England
[21] Appl. No.: 728,490
[22] Filed: Sept. 30, 1976
[30] Foreign Application Priority Data
Oct. 10, 1975 United Kingdom ............... 41536/75
May 5, 1976 United Kingdom ............... 18310/76
[51] Int. Cl. .............................................. B23k 27/00
[52] U.S. Cl. ........................................ 228/2; 228/112
[58] Field of Search .................................... 228/2, 112
[56] References Cited
U.S. PATENT DOCUMENTS

| 3,439,853 | 4/1969 | Deemie et al. | 228/2 |
| 3,717,295 | 2/1973 | Woodall et al. | 228/2 |
| 3,840,168 | 10/1974 | Searle et al. | 228/2 |

Primary Examiner—Robert C. Watson

[57] ABSTRACT

In a friction welding machine reaction loads are borne by a strut member and tie means. The strut member and tie means are interconnected by beam elements which support the workpieces against loads acting along the axis of relative rotation of the workpieces.

The machine has a ram which forces the workpieces together. One workpiece is held by a holder guided for movement along the strut member. One beam element is connected to the ram and the other to a support for the other workpiece. The tie means are connected to the beam elements intermediate the ends of the beam elements.

The strut member is not subject to any significant bending loads arising from reaction forces so that accurate alignment of the workpieces on the axis of relative rotation is maintained.

12 Claims, 10 Drawing Figures

FRICTION WELDING MACHINE

BACKGROUND OF THE INVENTION

The invention relates to friction welding machines.

Friction welding machines are known in which two workpieces are forced together in rotational rubbing contact by pressure-applying means such as a hydraulic ram. Relatively high forces are applied to the workpieces along the axis of relative rotation and it is necessary to support the workpieces against those forces.

In known machines one workpiece is supported against those forces during welding by an abutment member which forms part of a head assembly including a rotatable chuck which rotates the workpiece. Another workpiece is supported against those forces by another fixed abutment member or backstop assembly and is steadied laterally by a clamp.

In such known machines one or the other of the abutments is acted on by the pressure-applying means. The pressure-applying means is anchored to a heavy structure which usually lies horizontally so as to form a base for the machine. The movable workpiece support is movable lengthwise of the base by the pressure-applying means and is supported upon the base. The fixed abutment member is secured to the base.

The reaction forces act on the base through the anchorage point of pressure-applying means and through the fixed abutment, and, since those two points are offset from the centre line of the base, the base is subjected to a bending moment and is deflected by those reaction forces. Where larger machines are involved, the forces are so great that the deflection in the base is relatively large. This means that accurate alignment of the workpieces on the rotational axis is impossible because the deflection of the base causes deflection of the guide surfaces on the base along which the support for movable workpiece runs.

It is also known to use tie elements or bars arranged in the same plane as the rotational axis but the use of such arrangements is very limited because for high-volume production machines the bars severely limit the freedom of movement both of workpieces as they are transferred to the machine and the successive welded components as they are transferred from the machine.

U.S. Pat. No. 3,717,295 assigned to the assignee of the present application describes and claims improved forms of construction of the base structure which reduce the adverse effect of reaction forces on the accuracy of the relative positioning of the workpieces.

In that patent it is proposed to provide the machine with transverse elements, which abut with their ends directed in one direction (e.g. upper ends) said pressure-applying means on one hand and one workpiece support on the other hand; are connected intermediate their ends by a tension tie member (which experiences tension forces); and are connected at their ends directed in the other direction (e.g. lower ends) by a pressure strut member (which experiences compressive forces).

The machine according to the present invention is a further modification and improvement over the subject-matter of U.S. Pat. No. 3,717,295.

The accuracy of positioning of the displaceable workpiece support is thus optimised under all conditions of operation of the machine.

Also, the tension member can be simplified: in particular the tension member can take the form of two or more tie bars.

SUMMARY OF THE INVENTION

The invention provides a machine in which the forces and reactions arising from operation of the pressure-applying means are transferred from the pressure-applying means and from one workpiece to a strut member on which a holder for said one workpiece is movably guided, the strut member being subjected to no bending load or to a negligible bending load insufficient adversely to affect the accuracy of relative positioning of the workpieces. The transfer of loads in that way is effected by the use of a tie member or members which interconnect elements which abut or are connected to the pressure-applying means and to a support for one workpiece. The tie member(s) or each of them is positioned intermediate that location at which the element (in each case) is connected to, or acts on, the pressure-applying means or workpiece support, on the one hand, and that location at which the element is connected to, or acts on, the strut member on the other hand.

This gives the advantages that both accuracy of relative positioning of workpieces is achieved, and access for workpieces to be transferred to the working location on the machine and freedom of removal of welded components from the machine are achieved.

At the same time the form of construction of the main supporting structure of the machine, especially in large machines, capable of exerting hundreds of tons of force during welding, is enabled to be relatively simple, of low cost and of light weight. These factors are very important in typical applications where the machine is required to produce welded components in high volume production environments e.g. automotive component production.

Figure 1:
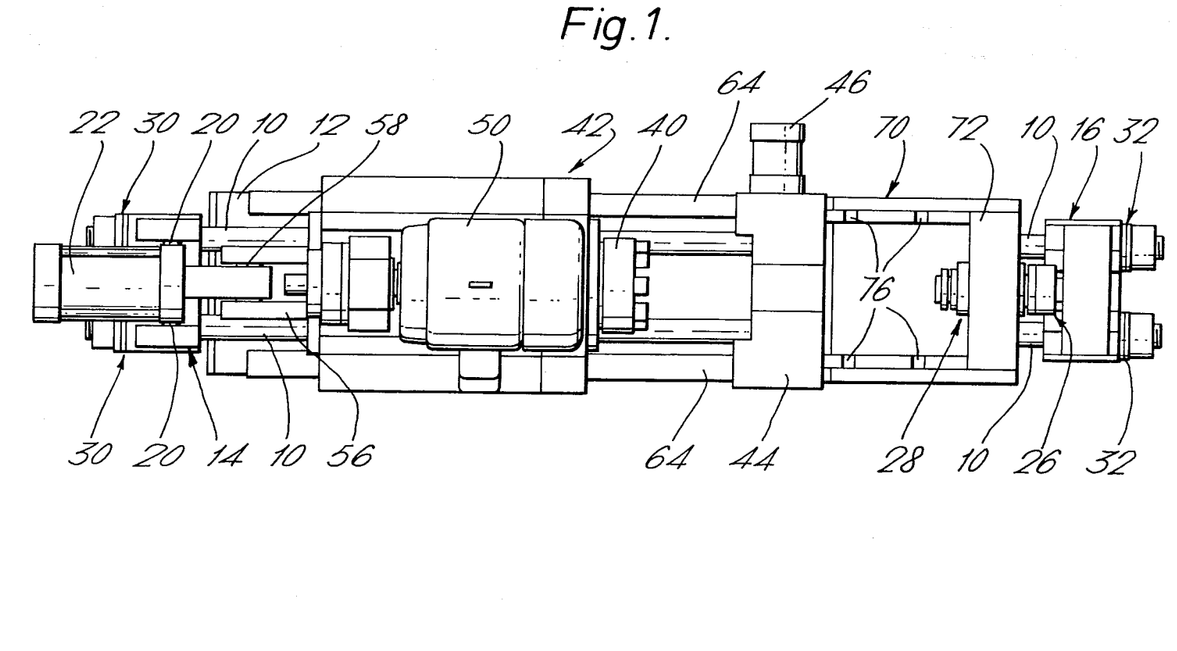
FIGS. 1 to 3 are, respectively, a plane of the machine a side elevation and an end elevation as seen looking in the direction of the arrow in FIG. 2.
Figure 2:
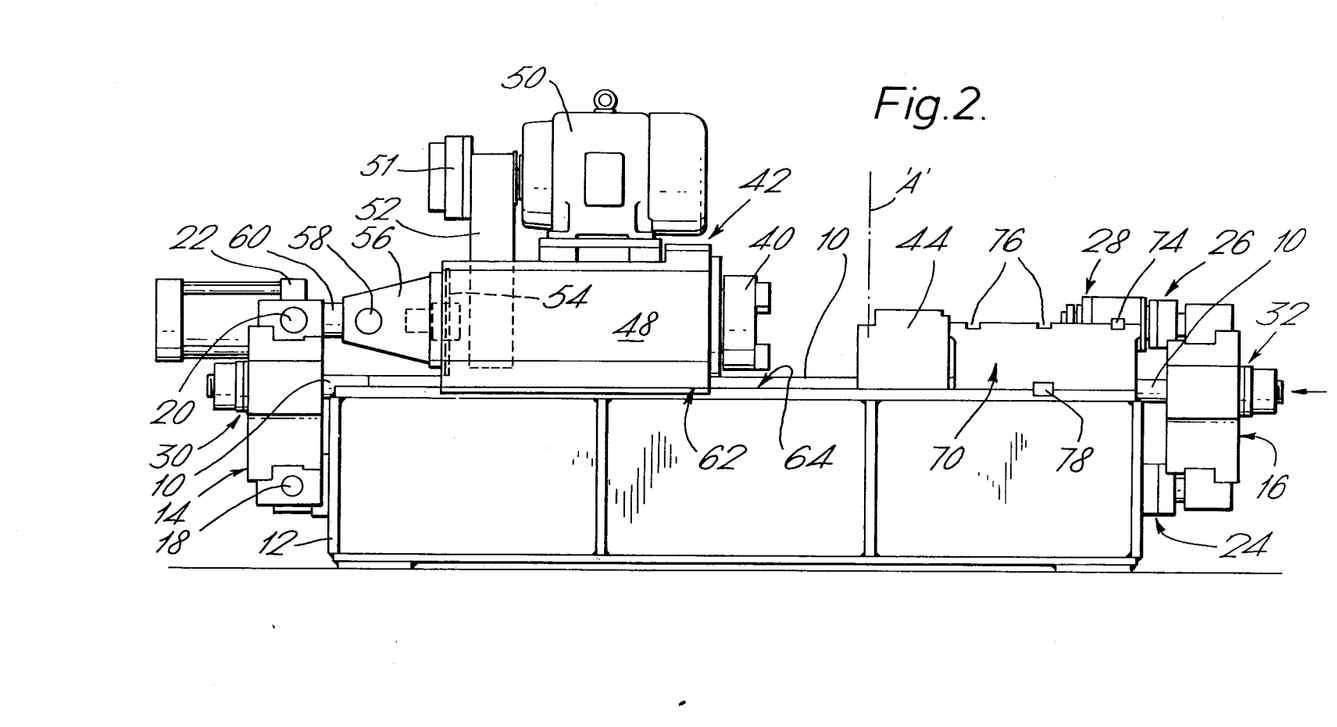
Figures 3, 7:
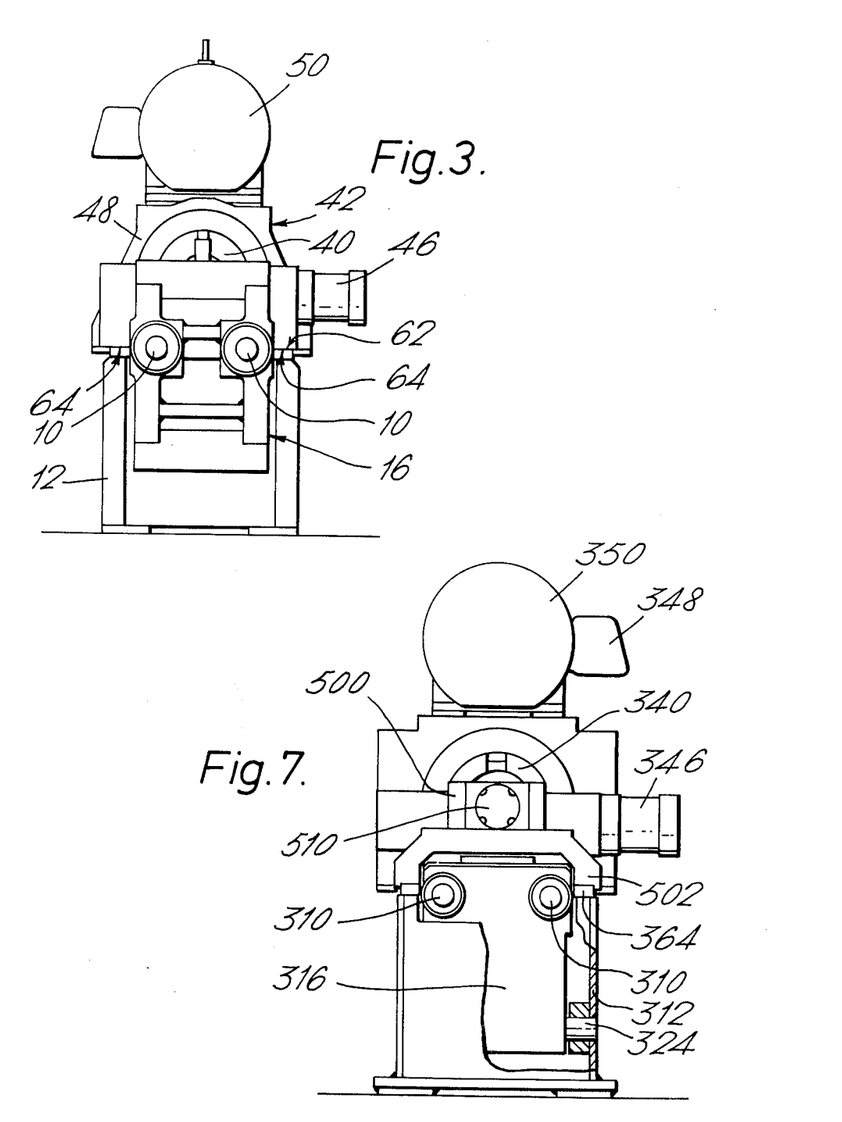
FIGS. 6, 7 and 8 are respectively, a plan of a second embodiment of friction welding machine; and end-elevation of the end "A" of the machine shown in FIG. 6 (with part cut away); and a side elevation (with parts cut away) of the side "B" of the machine shown in FIG. 6.

FIGS. 1 to 3 show the machine, a so-called "sliding head" type of machine, comprising a body-structure which includes tie means in the form of two tie-bars 10 and a strut member in the form of a base structure 12. The tie-bars 10 extend beyond the ends of the base 12 and are pivotally connected at their first ends to a first beam element in the form of lever means 14 and at their second opposite ends to a second beam element in the form of a lever means 16. The first lever means 14 is pivotally connected at its lower end by a horizontal pivot-pin 18 to the adjacent end of the base 12, and at its upper end the first lever means 14 is pivotally connected by horizontal pivot pins 20 to the cylinder 22 of a hydraulic ram.

The second lever means 16 is pivotally connected at its lower end at 24 to a mounting at the adjacent end of the base 12 and at its upper end the second lever means 16 is connected at 26 to one end of a workpiece support or a back-stop assembly 28 described more fully below. The pivotal connections at 30 and 32 between the first and second lever means 14 and 16 respectively, and the respective ends of the tie-bars 10, and the pivotal connections at 24 and 26 are all such as to permit limited universal pivotting, each connection being of the part-spherical kind. Each tie-bar has a nut which engages a ring having a part-spherical convex surface engaging a corresponding part-spherical recess in another ring, which is carried by the lever.

Figure 5:
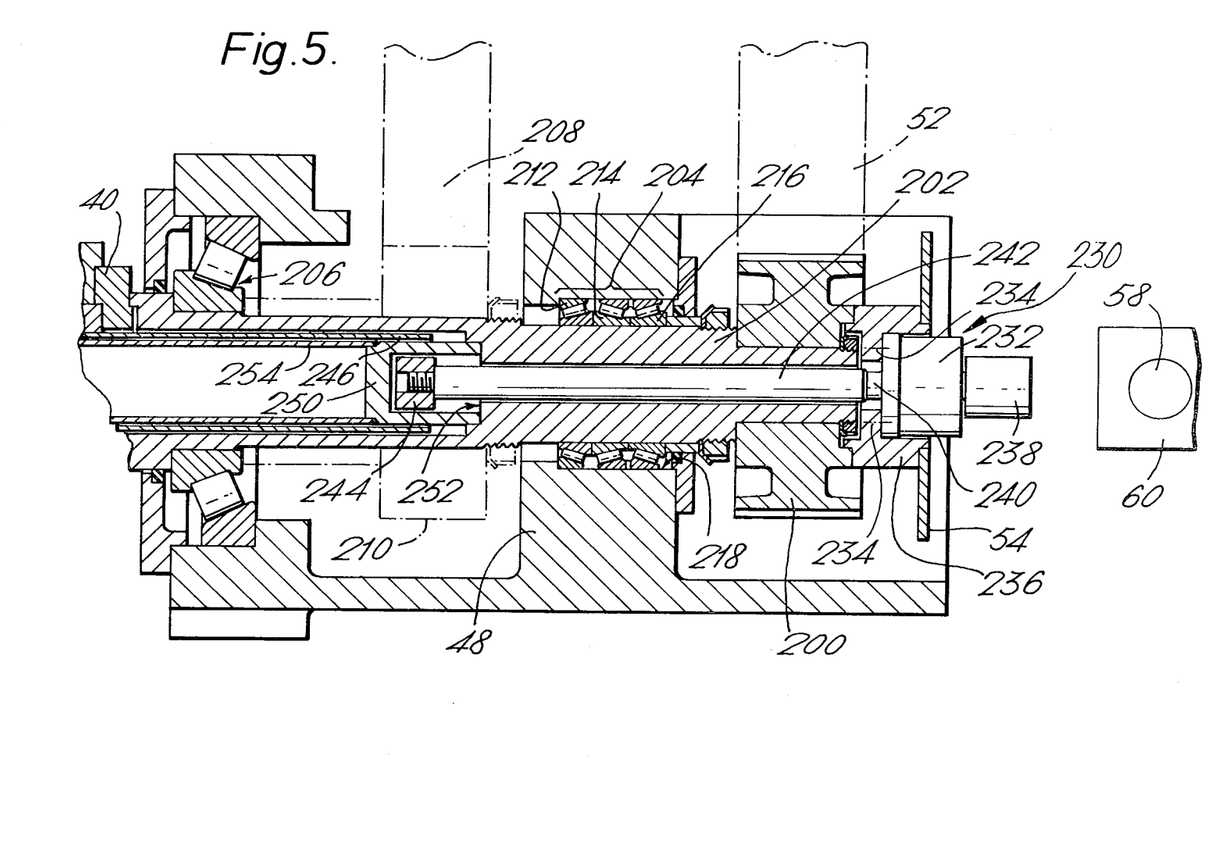
FIG. 5 is a vertical longitudinal section on an enlarged scale through part of the opposite end of the machine to that referred to in relation to FIG. 4 showing details of the drive to the movable holder means (this section is drawn reversed left-to-right compared with FIGS. 1, 2, 3 and 4)

The machine also comprises a chuck 40 mounted on the slidable head 42 of the machine and a clamp 44 mounted on the base 12 and including a hydraulic actuating piston-and-cylinder 46. The head 42 comprises a housing 48 on which is mounted an electric motor 50 which drives the chuck 40 through a pneumatically operable clutch 51 and a drive-belt 52. The chuck 40 is mounted on a spindle assembly (described more fully with reference to FIG. 5) which includes a brake disc 54 upon which brake means (not shown) can act. The spindle assembly includes a workpiece support or back-stop engageable by the workpiece gripped in the chuck (FIG. 5).

The rear end of the housing 48 has a trunnion assembly 56 which is connected by a horizontal pivot pin 58 to the piston rod 60 extending from the piston within the ram cylinder 22. The ram piston and the rod 60 forms a support means to provide reaction force to support the workpiece gripped in the chuck 40.

The housing 48 has lowermost horizontal slide surfaces at 62 engaging upper slide surfaces 64 on the base 12. The common plane of the sliding surfaces contains the central longitudinal axes of the tie-bars 10. The housing 48 has at its front end a relatively large-diameter thrust bearing (FIG. 5) which is mounted in a casting which partly constitutes the housing 48. The casting has two circular holes (not shown) in its lower front part through which the tie-bars 10 pass with clearance.

The back-stop assembly 28 is mounted in a bracket 70 which includes a bracket member 72 which can be located in three alternative positions on the remainder of the bracket assembly by means of keys indicated at 74. Unoccupied keyways are shown at 76. The assembly 70 is located on the base 12 by keys 78.

Figure 4:
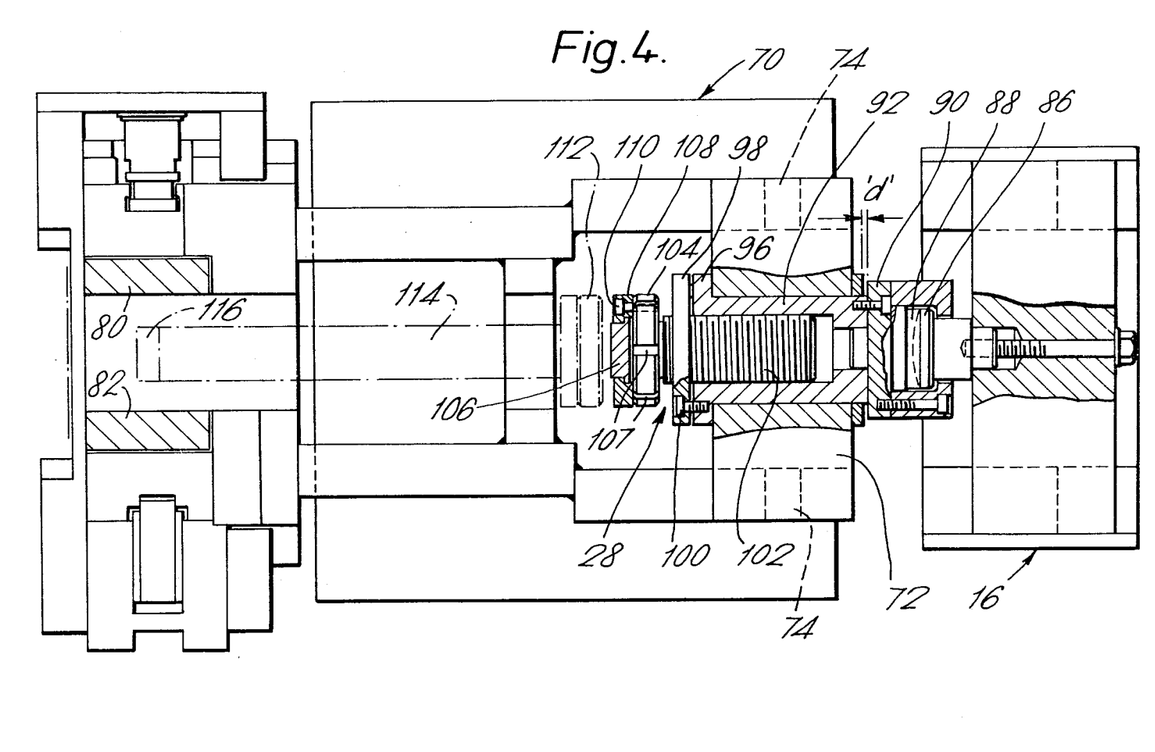
FIG. 4 is a plan partly in horizontal section on an enlarged scale of one end of the machine showing details of the backstop means.

FIG. 4 shows clamp 44, the bracket assembly 70 and the back-stop assembly 28 in greater detail. The clamp 44 has two jaws 80, 82, relatively movable transversely of the apparatus by the piston-and-cylinder 46 (FIG. 2) by means of a lever and pull rod-assembly so that the jaws are self-centering.

FIG. 4 shows the upper end of the lever means 16 and the pivotal connection at 26 between the lever means 16 and the back-stop assembly 28. The connection 26 is made up of a partly-spherical head 86 secured to the lever means 16 and received in a correspondingly spherically-recessed washer 88, which is mounted on a thrust-plate 90 secured to the rear end of a hollow cylindrical thrust member 92. The plate 90 also carries a retaining cap 94 having an inwardly-directed flange which traps the head 86 within the cap 94, but with a small clearance, so that the member 92 is interconnected for movement with the lever means 16 in both sense of movement.

The member 92 is slidable through a small distance of some 2 millimeters indicated at "d" in a slideway through the bracket member 72.

The front end of the member 92 is formed with an outwardly-directed flange 96 and carries a nut 98 securable to the member 92 by screws, one of which is shown at 100. The nut 98 is engaged on an externally screw-threaded jack member 102 which is in screwed engagement with the internally tapped bore of the member 92. The jack member 102 has an enlarged head 104 formed with slots 107 to facilitate turning of the member 102. The head 104 carries a thrust-piece 106 held to the head 104 by a retaining-ring 108 and screws 110. The jack member 102 is shown near to its extreme rightward position in relation to the member 92. The extreme leftward working position of the jack member 102 in relation to the member 92 is shown in ghost outline at 112. The thrust-piece 106 forms a support means for providing reaction force to support the workpiece held in the clamp 44.

A relatively long workpiece held in the clamp 44 could be engaged with the thrust-piece 106 in any position of the jack member 102 between the ghost position and the full line position. A sufficient length of threaded engagement between the jack member 102 and the member 92 then exists to sustain the heavy thrust loads applied to the workpiece during welding. When a relatively short workpiece is held in the clamp 44, the thrust-piece 106 is replaced by an extension thrust rod shown in ghost outline at 14. The rod 114 carries a replaceable thrust-piece 116 at its left-hand end.

The jack member 102 can be locked in any of its adjusted positions in relation to the member 92 by means of the nut 98 and the screws 100 which, when tightened, prevent rotation of the jack member 102. A clearance between the nut 98 and the end of the member 92 is always preserved as shown so as to ensure that thrust is not borne by the short threaded parts of the jack member and nut instead of by the long threaded engaged parts of the jack member and the member 92.

FIG. 5 shows details of the chuck drive spindle assembly and it is again pointed out that the drawing is reversed as compared with FIGS. 1, 2 and 4 in that the righthand of the spindle assembly in FIG. 5 appears to the left in FIGS. 1 and 2. The trunnion 56 is omitted from FIG. 5. The drive belt 52 is shown engaging a pulley 200 secured to a hollow spindle 202 supported on a guide bearing assembly 204 and a thrust-bearing assembly 206, which is the thrust-bearing referred to above. The rear of the chuck 40 is just seen mounted on the left-hand end of the spindle 202.

FIG. 5 also shows, for the purpose of illustration only an alternative drive in the form of a chain indicated in ghost outline at 208 engaging a chain wheel 210 secured to the spindle 202. A silent chain drive is preferred where a DC drive motor is used. In that case the brake disc can be mounted on the motor output shaft instead of on the spindle 202.

The guide bearing assembly 204 comprises a fixed bearing 212 backed by a double floating bearing, having two races 214 and 216, which is free to slide longitudinally in the cylindrical mounting surface 218 of the housing 48. This form of construction ensures that should any axial separation of the races of the bearing 212 inadvertently arise, the spindle axis will be maintained accurately in position; in other words the "Total Indicated Reading" will be maintained in respect of the accuracy of positioning of the rotating spindle, which is extremely important in heavy-duty production apparatus of this kind.

An oil gap can if preferred be provided between the bearing 212 and the double bearing 214, 216 though this is not shown.

The chuck 40 is of the 3-jaw, draw-bar hydraulic piston-and-cylinder mechanism 230 the cylinder 232 which is secured by screws (not shown) the axes of which are indicated at 234 to an annular member 236. The member 236 is secured to the pulley 200 and has mounted on it the brake disc 54. The mechanism 230 incorporates a running rotary hydraulic coupling 238 through which hydraulic fluid is supplied to the cylinder 232.

The piston rod 240 of the mechanism 230 rotates with the cylinder 232 and engages the right-hand end of the chuck draw-bar 242, which extends within the spindle 202. The left-hand end of the draw-bar 242 is connected to a bridge 244 which is connected to an outer tube 246 extending leftwards to the chuck 40. The left-hand end (not shown) of the tube 246 is connected to the wedges which on movement with the tube 246 force the chuck jaws to close, or to open, as the case maybe.

The bridge 244 is accommodated within a horse-shoe shaped stop-member 250, the right-hand end of which engages an internal shoulder 252 formed on the spindle 202. The left-hand end of the stop-member 250 is secured to the right-hand end of a shroud tube 254 which extends leftward into the chuck 40. The shroud tube 254 prevents dirt and swarf accumulating in front of the stop-member 250.

A workpiece (not shown) held in the chuck 40 will extend into the shroud tube 254 and will engage the stop-member 250. In the case of a short workpiece, a spacer stop-member (not shown) can be inserted in the shroud-tube 254 engaging the stop-member 250 and will be engaged by the workpiece. Thus, axial load can be imposed on the workpiece in the chuck 40 by the ram piston 60 acting on the housing 48 and thence through the thrust bearing 206; the spindle 202; the shoulder 252; and the stop-member 250.

The machine incorporates further features not shown in the drawings. A pack of disc-springs is located between, and level with, the tie-bars 10. The spring-pack acts on the lever means 16 and is arranged to be compressed by motion of the back-stop assembly 28 towards the head 42 under the action of the ram piston 60 and reacted load passed by the tie-bars to the back-stop assembly. The spring-pack therefore expands on release of that load and re-sets the lever means 16 and back-stop assembly in its extreme rightward position as shown in FIG. 4, with the flange 96 engaging the member 72.

The base 12 has a stop against which the lever means 14 normally engages in the un-operated condition of the apparatus prior to loading workpieces in the holder means constituted by the chuck 40 and clamp 44. Under counter-clockwise motion about the pivot pin 18, the lever means 14 moves away from the stop.

The machine also has limit switches by which motion of the head 42 during welding is monitored. The switches are mounted on a corner which is slidable lengthwise of the base 12 under the action of an arm attached to the movable back-stop assembly 28.

OPERATION

FIGS. 1 and 2 show the head 48 in its extreme leftward position ready to receive a workpiece in the chuck 40. The lever means 14 is in engagement with its stop just described so that a datum position for the lever means and the head 48 is established. The back-stop 28 is in its extreme rightward position under the action of the spring-pack just described. The chuck jaws and clamp 44 are open.

Workpieces are fed into the chuck and clamp, which both close to grip their respective workpieces. The workpiece in the clamp was positioned against the back-stop 28 as it was placed in the clamp. Closure of the clamp 44 in some cases might cause slight movement of the workpiece away from the back-stop 28 but that is compensated for as described below. The workpiece in the chuck has an inner end engaging about one inch in front of the front faces of the chuck jaws.

The motor 50 is energised to rotate the chuck 40 and ram piston 60 is advanced by pressurisation of the cylinder 22 to advance the head 48 until the free end of the workpiece in the chuck 40 comes into rubbing engagement with the end of the workpiece in the clamp 44 in the plane marked at "A" in FIG. 1. Thus, both workpieces are gripped very closely to the rubbing faces at which the weld is to be effected.

The cylinder 22 continues to be pressurized so that the workpieces are forced together. The reaction forces from the cylinder 22 are transferred to the lever means 14 and thence to the tie-bar 10. If any clearance has arisen between the rear end of the workpiece in the clamp 44 and the back-stop 28, the reaction forces on the tie-bars 10 now causes the lever means 16 to act in an anti-clockwise sense to move the back-stop 28 into engagement with the rear end of the workpiece in the clamp 44. The spring pack is thus compressed. Continued pressurisation of the cylinder 22 now causes a substantial pressure of engagement between the rubbing faces of the workpieces in the plane "A" and heat is developed by friction. The tie-bars 10 are under tension only. The base 12 is under compression as a pure strut. The axes of the pivots 18 and 24 intersect the neutral axis of the base 12.

The workpieces adjacent their rubbing faces become plastic and metal is displaced from the workpieces outwardly resulting in rightward movement of the head 48 as the workpieces shorten. The loss of length is known as "burn off" and is sensed by a limit switch system, which as mentioned above, takes into account movement of the back-stop 28 by virtue of the sliding mounting for the limit switch system.

When sufficient burn off has occurred corresponding to adequate heating of the workpieces to ensure that welding temperature and conditions have been reached, drive to the chuck 40 is abruptly discontinued by disengagement of the clutch 51 and the brake is applied to the disc 54 to halt the chuck 40 and its workpiece. At the same time the force under which the workpieces are formed together is suddenly increased to a higher value, the "forging" load, which is maintained for a brief period. This completes the friction weld between the workpieces.

The clamp 44 is released and the pressurisation of the cylinder 22 is reduced. The tension in the tie-bars is relaxed so that the bars contract and pull the lever means 14 against its stop. The spring pack extends and re-sets the back-stop assembly 28. The cylinder 22 is pressurised in the reverse sense to retract the head 48 so that the chuck 40 moves the composite welded component clear of the clamp 44.

The chuck 40 is released and the component is removed from the chuck 40 and is ejected from the machine.

Under the high forging load, for example 60 to 70 tons, the base 12 continues to be stressed as a pure strut only in compression along its neutral axis. Thus, bending loads are not imposed on the base 12 to any significant extent and the accuracy of the upper slide surfaces 64 is maintained, thus maintaining accuracy of welding of the workpieces. The lever system is such that for example with a 62 tons load applied to the workpieces the tie-bars experience 103 tons tension load and the base 12 only 41 tons compression load.

The loads on the two workpiece supports namely, the thrust-piece 106 (or 116) in the backstop assembly 28 and the backstop 250 (or spacer stop-member) are transferred to the levers 14 and 16 which act as abutment elements for that purpose.

At the same time, freedom of access to the space in which the workpieces are fed to and from the region above the bed 12 is optimised, since the tie-bars 10 do not obstruct such access. It is preferred to eject the completed component downwardly between the tie-bars 10 and through an aperture in the base 12.

The clamp 40 can be adjusted in position along the base 12 but is secured to the base and engages the bracket assembly 70 as shown or engages a spacer engaging the assembly 70. The clamp 44 is not required therefore to sustain forces (or not to sustain substantial forces) acting along the base on the workpiece held in the clamp. The bracket assembly 70 is also relieved of such loads by the floating backstop 28 acting as just described.

The invention can be applied to machines other than of the so-callled "sliding head" type and is applicable for example to "fixed head" and double sliding-head machines. A "fixed head" machine is one in which the head 48 is fixed to the strut member 12 and the workpiece support equivalent to assembly 28 is advanced by a ram towards the fixed heads. Further description of the main components of a "fixed head" machine is given in U.S. Pat. No. 3,717,295.

The use of universal pivots at 24, 26 and 30 ensures that slight angular deflection of the lever means 14 or 16 out of planes normal to the plane of FIG. 1 do not adversely affect the force-compensating system. Furthermore, equal tension is ensured in the tie-bars 10 even where the pivots at 30 and 32 on one bar are spaced apart by a distance slightly different from the distance between the pivots 30 and 32 on the other bar. Large nuts are provided on the ends of the bars 10 and every care is taken on setting up the machine to make the spacing of the pivots the same for each bar, but slight inaccuracy cannot be ruled out. Such inaccuracy has no adverse effect, using the invention.

Figure 6:
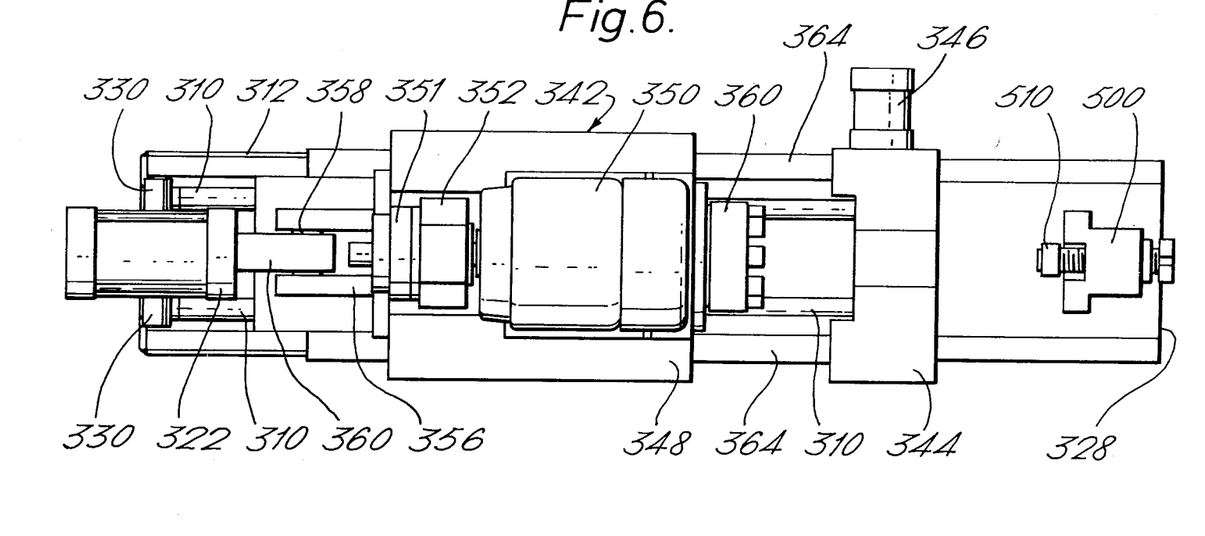
Figure 8:
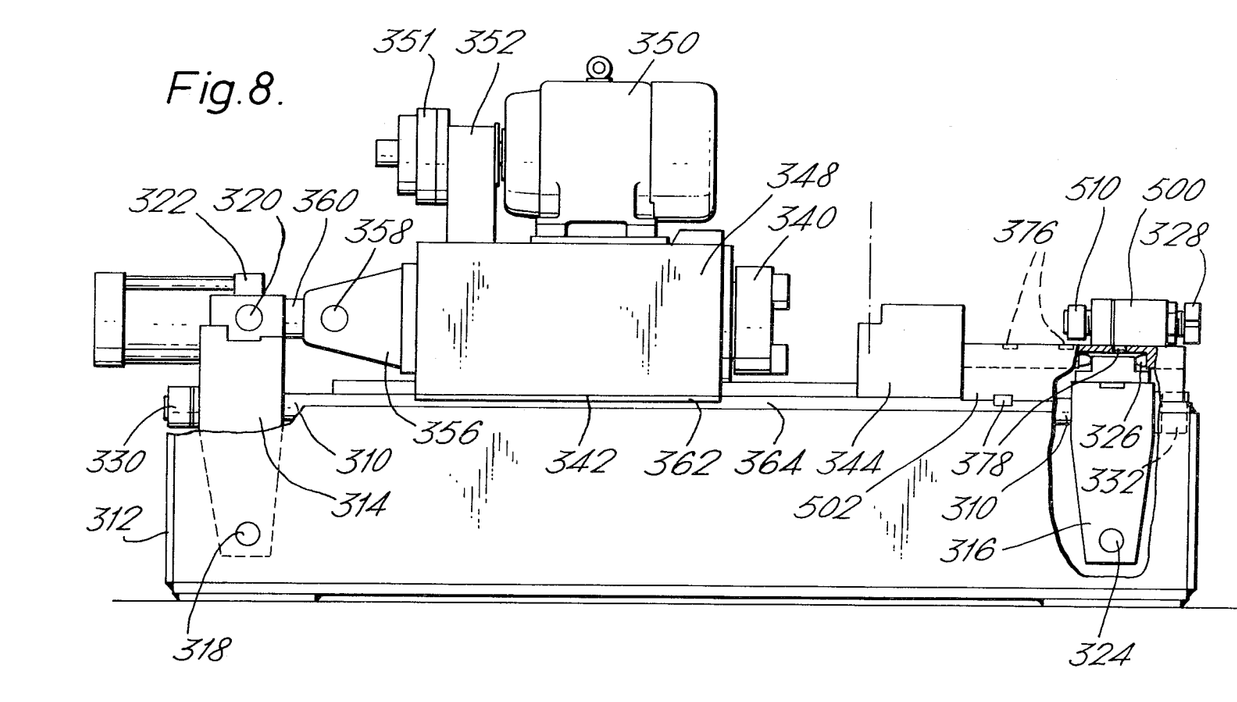

FIGS. 6 to 8 show a so-called "sliding-head" type of machine similar to that described above. The machine comprises a body-structure which includes a first part in the form of two tie-bars 310 and a second part in the form of a base structure 312. The tie-bars 310 in this modification do not extend beyond the ends of the base 312 and are pivotally connected at their first ends to a first lever means 314 and at their second opposite ends to a second lever means 316, both lever means being contained within the base structure 312. The machine generally, and the base structure in particular, presents a very simple appearance as the result of the enclosing of the tie-bars and lever means within the base structure and a further advantage lies in the fact that the lever means are protected from swarf or other contamination and do not present protruding parts dangerous to operatives. The workshop environment is considerably improved by those design considerations.

The lever means 314, 316 are pivotally connected at their lower ends by, respective, horizontal pivot-pins 318, 324 to the base structure 312. The upper end of the first lever means 314 is pivotally connected by a horizontal pivot pin 320 to the cylinder 322 of a hydraulic ram.

The upper end of the second lever means 316 is pivotally connected to a combined backstop and tooling saddle assembly 328 by means of a universally pivotable connection 326. The tie-bars 310 are pivotally connected at their ends to the lever means 314 and 316 by connection at 330 and 332, respectively, of a part-spherical kind similar to the connections described above.

The machine also comprises two holder means for workpieces, one in the form of a chuck 340 mounted on the slidable head 342 of the machine; and the other holder means being in the form of a clamp 344 mounted on the base structure 312 and including a hydraulic actuating piston-and-cylinder 346. The head 342 comprises a housing 348 on which an electric motor 350 is mounted which drives the chuck 340 through a pneumatically-operable clutch 351 and a drive-belt 352. The chuck 340 is mounted on a spindle assembly (not shown) which includes a disc brake operable to stop rotation of the spindle.

The rear end of the housing 348 has a trunnion assembly 356, which is connected by a horizontal pivot pin 358 to the piston rod 360 extending from the piston within the ram cylinder 322.

The housing 348 has lowermost horizontal slide surfaces at 362 engaging upper slide surfaces 364 on the base structure 312. The common plane of the sliding surfaces is close to the central longitudinal axes of the tie-bars 310. In general, the machine design should be such as to place the tie-bars as close to the axis of rotation of the chuck as possible and so that the lower ends of the lever means 316, 318 are as low as possible. By such design considerations, the tie-bars can be designed for minimum practicable loading.

The tie-bars 310 may be arranged to pass through apertures in the front component of the housing 348 as described above.

The back-stop assembly 328 comprises a thrust member 500 and a tooling saddle 502 on which the member 500 is mounted and to which it is interconnected by a key 378. The member 500 can be secured to two alternative positions by setting the key 504 in keyways 376 in the saddle 502 so that the member 500 is nearer the clamp 344. The position chosen depends on the length and shape of the workpice to be held in the clamp 344.

The thrust member 500 has a jack member 510 screwed into it so as to be adjustable lengthwise relatively to the member 500.

The saddle 502 is secured to the base structure 312 by means which include a transverse key 378 received in keyways in both members.

The saddle 502 does not move relatively to the base structure 312 during operation of the machine, nor does the thrust member 500 and the jack 510. However, the pivotal interconnection between the lever means 316 and the back-stop assembly 328 and the base structure 312 relieve the base-structure 312 of any significant bending load and the high tensile forces in the tie-bars 310 are reacted in the base-structure 312 by, or almost wholly by, compressive forces, so that the base-structure 312 acts as a pure strut and experiences no significant bending load. The slide surfaces 364 of the base structure 312 are therefore not distorted by the large reaction forces and remain true so that accuracy of welding is ensured.

The operation of the machine is generally otherwise similar to that of the machine described with reference to FIGS. 1 to 4.

The invention is also applicable to double-ended machines. For example, a typical double-ended machine is one which is designed to weld two workpieces one to each end of a third intermediate workpiece located between them; the workpieces typically may form the major part of drive axle housing for an automotive vehicle.

In such a machine a longer base structure would support two slidable heads each similar to the head 342 arranged with their chucks facing toward one another. Respective first lever means similar to the means 314 would be pivotally interconnected to the heads and longer tie-bars would be pivotally interconnected at their ends to the upper ends of the respective lever means. The lower ends of the first lever means would be pivotted to the base structure 312.

The base structure 312 would have secured to it between the two heads a boss engageable with an aperture in the third intermediate workpiece. The second lever means (similar to the means 316) would be pivotally connected to the base structure 312.

The tie-bars 310 would be pivotally interconnected to the second lever means. For example, the tie-bars could each carry annular stops, one on either side of the lever means and capable of transmitting full tensile load to the lever means in either direction.

Two clamp means similar to the clamp 344 could be provided for holding the intermediate workpiece between the boss and one head and between the boss and the other head. The thrust member 500 and jack 510 would be dispensed with and the boss would form part of the saddle 502.

With these modifications the machine can readily be envisaged as being made up of a left-hand half similar to the machine as shown in FIG. 7 to the left of the line X — X, and an exactly similar but oppositely arranged right-hand half to the right of the line X — X.

When such a machine is operated, the two heads, with the respective outer workpieces held in their chucks move inwardly to force the workpieces in rubbing engagement with the intermediate workpiece. The heads, almost without exception, reach their fully advanced positions at slightly separated instants so that at any instant during operation the loads in the halves of the tie bars connected to the leading head are greater than the loads in the other halves of the tie bars. The two halves of the machine therefore function in exactly the same way as the single-ended machine described first above and the second lever means connected to the boss are subjected to full load firstly from the leading head, whichever it may be, and then to full load from the succeeding head.

In a further modification (not shown) the second lever means 316 as shown in the drawings in a single-ended machine may be pivotally connected to a floating back stop as described with reference to FIG. 4, the lever means however being enclosed within the base structure 312 as shown in FIGS. 6 to 8.

In a further modification of a single-ended machine (not shown) the saddle 502 may be slidable so that the thrust member 500 and jack member 510 are pushed towards the workpiece in the clamp 344 in a manner similar to the movement imparted to the floating backstop described in our earlier application.

Figure 9:
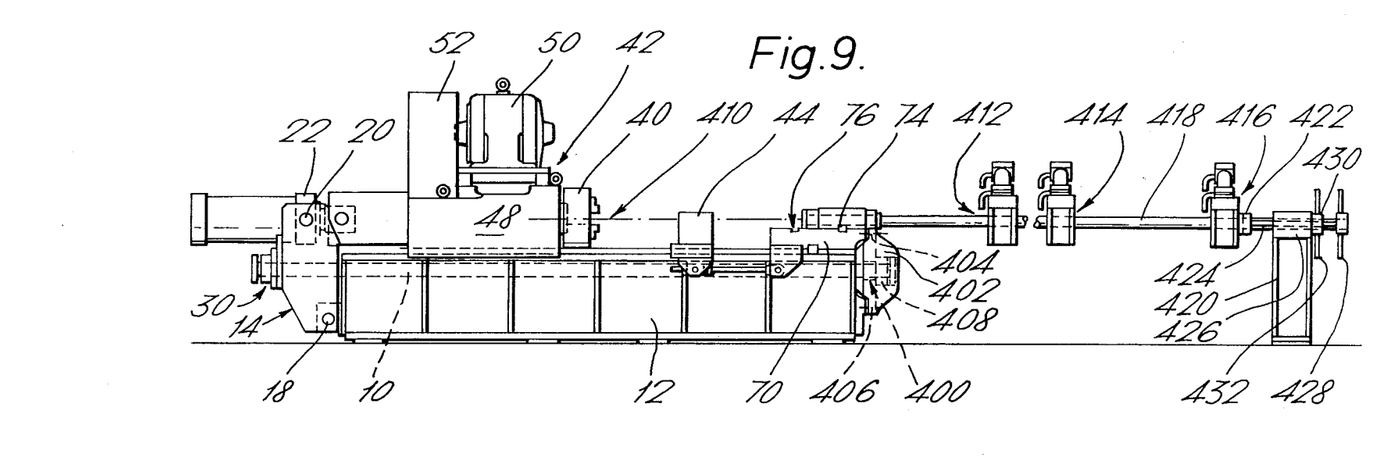
FIG. 9 is a side elevation of a third embodiment of friction welding machine.

FIG. 9 shows a third embodiment of machine which is similar to that described with reference to FIG. 1 so far as the left-hand end of the machine is concerned but which has important modifications at its right-hand end. The reference numerals of FIGS. 1 to 8 have been used as far as possible in FIGS. 9 and 10.

The two tie-bars 10 at their right-hand ends pass through apertures 400 in respective abutment elements in the form of yokes 402. Each yoke 402 is secured by bolts at 404, 406 to the rear end of the bracket member of the bracket assembly 70 and to the right-hand end of the base or strut member 12, respectively. Each tie-bar 10 has a large nut 408 on its end, which bears against the respective yoke in plain face-to-face abutting relationship.

The yokes 402 are of very heavy stiff construction and deflect only very little under full load.

The yokes 402 are not required to pivot in relation to the bracket assembly 70 and the strut member 12 to any great extent but need only deflect very slightly in relation thereto. The plain engagement between the ends of the yokes 402 and the bracket assembly 70 and the strut member 12, together with the securing bolts can be regarded as a pivotal interconnection of a kind allowing only very slight pivotal movement sufficient to accommodate the small deflections of the yokes 402. Each yoke is a lever but is not as freely movable as the corresponding lever described above.

The elongation of the tie-bars 10 under load is accommodated mainly by the pivotal connections at the left-hand end of the machine.

The bracket assembly 70 in this case does not include a backstop.

The machine is intended especially for welding a workpiece held in the chuck 40 to a long tubular workpiece which is gripped in the clamp 44 against rotation and against movement transversely of the rotational axis 410. The workpieces may for example be parts of an oil drilling stem.

The long tubular workpiece is supported against the endwise thrust applied by the ram 22 by auxiliary clamps 412, 414, 416, which are mounted in line with the chuck 40 and clamp 44 on two parallel auxiliary tie-bars 418. The bars 418 are co-planar with the rotational axis 410 and are spaced apart one on either side of the axis. The left-hand ends of the bars 418 are secured to the bracket assembly 70 and the right-hand ends are supported by an auxiliary support 420.

A back-stop 422 can be adjusted relatively to the clamps 412, 414, 416 along the bars 418 by a screw 424 working in a nut 426 on the auxiliary support 420. The screw can be turned by a handle 428 and locked by a nut 430 having a handle 432.

The auxiliary tie-bars and the back-stop 422 are mechanically equivalent to the backstop assemblies 28 and 328 described above and act to support the workpiece held in the clamps 412, 414 and 416.

The yokes 402 are spaced apart on either side of the rotational axis 410 and the gap between them allows relatively large-diameter workpieces to be accommodated between them, aligned with the axis 410 and so enhances the versatility of the machine.

The use of separate yokes 402 simplifies the procedure for setting up the machine ready for use. The ram 22 typically may exert a maximum thrust in use of 100 or 150 150 tons or more and it is important that the tie-bars 10 share the load as nearly equally as possible. One tie-bar may be expected to have a percentage elongation slightly greater than the other because of manufacturing tolerances and assembly clearances in the machine.

On setting up the nuts at the connections at 30 are tightened to give a nominally equal-length position on the tie-bars. Elongation indicators are applied to the bars 10 and the ram 22 is operated to load the tie-bars 10 and base 12 fully. The indicators show which bar has extended most. The ram is de-energised and the nut on one bar at 30 is adjusted. The ram 22 is re-energised and the meters are re-checked. This is repeated if necessary until the meters indicated equal elongation under load. Throughout this adjustment procedure there is no need to adjust the nuts 408 and the right-hand ends of the bars 10 are known to be correctly positioned at a common datum position throughout. This means that the change in length of the workpieces as they are welded (owing to extrusion of plastic metal during "burn-off") can be accurately taken into account to ensure that the length of the welded component is consistently within the required tolerance.

The setting up procedure just described can be adopted without risk of introducing twisting or bending loads, transversely of the machine, in the yoke assembly because there is a separate yoke for each tie-bar. The two yokes can deflect independently to satisfy the load conditions imposed on them.

In a modification (not shown) the lever or yoke or yokes at the righthand end of the machine of the kind described above may be within the base 12 as shown generally in FIG. 5 (regardless of the kind of connections used between the lever and yoke or yokes and the workpiece support and the base) while the lever at the lefthand end remains outside the base. This can be useful where certain kinds of special clamping are required to suit certain workpieces.

In another modification (not shown) more than two tie-bars 10 may be used, for example, four two on either side. Each pair may be connected to a respective yoke or lever or all four may be secured to a common yoke or lever or each bar may be secured to a respective yoke or lever.

In yet another modification, the yokes can engage the base strut 12 and bracket assembly 70 at surfaces which allow rocking i.e. limited angular pivoting such as part-cylindrical radiussed or part-spherical radiussed surfaces. The securing bolts at 404 may be dispensed with and the yokes held in place by inter-engaging parts. The yokes may be supported against gravity by the tie-bars which may then be supported on suitable formations on the strut member 12.

In certain cases the workpiece held in a clamp or clamps such as the clamps 412, 414, 416, for example, may be supported (at least partly) against the endwise load applied by the ram by the frictional forces arising at the clamp or clamps. Usually, of course, a backstop assembly such as item 28 is necessary to give positive mechanical support to the workpiece.

Figure 10:
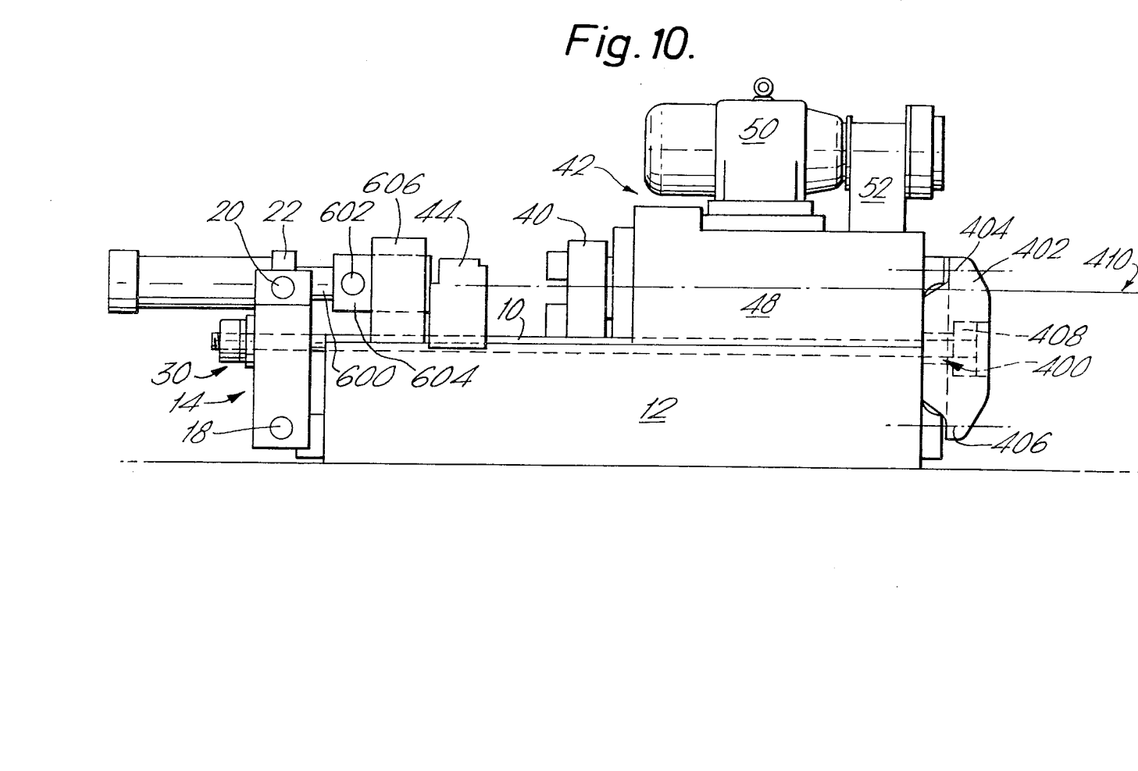
FIG. 10 is a side elevation of a fourth embodiment of friction welding machine.

A fixed head form of machine is shown in FIG. 10 in which reference numerals are used corresponding to those used in FIG. 9 so far as possible.

The ram has a piston rod 600 which is connected by a pivot pin means 602 to a spacer member 604, which is slidable through a closefitting bore in a housing 606 secured to the base 12.

The spacer member 604 can engage the rear end of a workpiece held in the clamp 44, which is slidable along the base 12 on the guide surfaces thereof. The spacer member 604 enables the piston of the ram to form a support for that workpiece to provide reaction force to maintain the workpiece in engagement with the workpiece held in the chuck 40.

The chuck 40 is part of the head 48 which in this embodiment is fixed, being secured to the base 12.

The tie-bars 10 extend between a lever assembly 14 as before and yokes 402 exactly similar to those described in relation to FIG. 9. The yokes 402 are secured by bolts at 406 to the base 12 and the head 48.

In operation of the machine, the ram 22 forces the workpieces together, the workpiece held in the clamp 44 being moved along the base 12 under the action of the spacer member 604. The clamp 44 is not engaged by the spacer member 604. The clamp 44 moves with the workpiece along the base 12 as the weld is made; the grip of the clamp 44 is sufficient to resist rotation of the workpiece which it holds.

The workpiece held in the chuck 40 is rotated by the motor 50 and drive transmission 52. The workpiece in the chuck 40 is supported by the backstop in the spindle on which the chuck 40 is mounted. FIG. 5 shows a stop-member 250 which can be used in exactly similar manner in a fixed head machine.

Such a stop-member forms a support providing reaction force as mentioned earlier but in this case the stop-member is in effect acted on by the yoke members 402.

I claim:

1. A friction welding machine of the kind in which first and second workpieces are relatively rotated about an axis of rotation comprising:
 pressure-applying means operable to force said workpieces against one another to impose on one another load acting along said axis;
 said pressure-applying means comprising first and second components relatively movable in the direction of said axis;
 said first component of said pressure-applying means and a further support means providing reaction forces for said first and second workpieces respectively;
 a strut member;
 first and second beam elements;
 each beam element adjacent a first end thereof being in force-transferring relationship with a respective end of said strut members;
 said first beam element adjacent a second end thereof being in force-transferring relationship with said second component of said pressure-applying means;
 said second beam element adjacent a second end thereof being in force-transferring relationship with said further support means;
 tie means interconnecting said beam elements intermediate said ends thereof;
 first and second gripping holders for holding said first and second workpieces, respectively;

means for producing relative rotation of said holders about said axis;
guide surface means on said strut member extending longitudinally thereof;
one of said holders being movably guided by said guide surface means longitudinally thereof relatively to said other holder and aligned therewith along said axis of rotation.

2. A friction welding machine according to claim 1, in which said one holder holds said first workpiece.

3. A friction welding machine according to claim 1, in which said one holder holds said second workpiece.

4. A friction welding machine according to claim 1, in which said tie means comprise a plurality of tie bars.

5. A friction welding machine according to claim 1, in which said first beam element is in force-transmitting relationship with said strut member, said tie means and said second component of said pressure-applying means through respective pivotal connection means.

6. A friction welding machine according to claim 1, in which said second beam element is in force-transmitting relationship with said strut member, said tie means and said second support means through respective pivotal connection means.

7. A friction welding machine according to claim 1, in which said second beam element is in force-transmitting relationship with said strut member, said tie means and said second support means through respective plain abutting surface means.

8. A friction welding machine according to claim 1, in which said second beam element is made up of two separate yoke members and in which said tie means comprise two tie bar means, one in force transmitting relationship with one yoke member and the other in force transmitting relationship with the other yoke member.

9. A friction welding machine according to claim 1, in which said tie means is positioned within said strut member.

10. A friction welding machine according to claim 1, in which at least one of said beam elements is positioned within said strut member.

11. A friction welding machine according to claim 1 comprising two halves each as claimed in claim 1.

12. A friction welding machine according to claim 1, in which one of said holders is a chuck mounted on a spindle rotatable by said means for producing relative rotation, said spindle being rotatably mounted in a housing in a guide bearing assembly which assembly comprises a fixed bearing means backed by a floating bearing means which is free to move longitudinally of said axis in a mounting in said housing.

* * * * *